INVENTOR.
STANLEY THOMAS DEAKIN

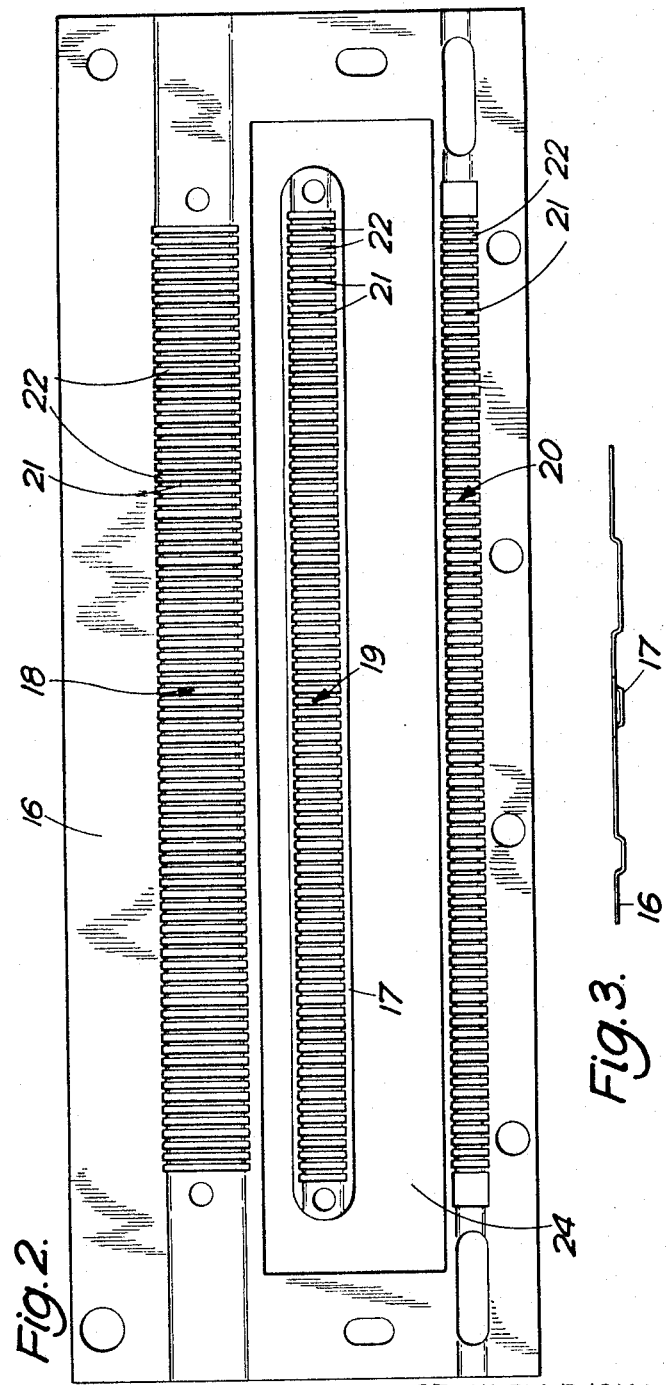

United States Patent Office 3,452,166
Patented June 24, 1969

3,452,166
CARD SENSING DEVICE COMPRISING A PLURALITY OF GRID SUPPORTED MOULDINGS
Stanley Thomas Deakin, Farlington, England, assignor to Sealectro Limited, Farlington, Portsmouth, England, a British company
Filed May 18, 1967, Ser. No. 639,392
Claims priority, application Great Britain, May 20, 1966, 22,672/66
Int. Cl. H01h 43/08; G06k 7/04
U.S. Cl. 200—46                 5 Claims

ABSTRACT OF THE DISCLOSURE

A device for sensing holes in a punched card includes a number of mouldings assembled in face-to-face relation to form a stack the position of each moulding being determined by end locating means comprising, for each end of the mouldings, a grid having bars and slots extending widthwise of the mouldings, the ends of the mouldings being received within the slots and each slot being open at at least one end to permit insertion or removal of the moudings in the lengthwise direction of the slots.

---

This invention relates to devices for sensing the holes in punched cards or webs (hereinafter called cards), and in particular to such devices having a plurality of sensing pins. The number of sensing pins provided usually depends on the number of possible places in which the card may be punched.

According to the invention a device for sensing the holes in a punched card has a plurality of rows of sensing pins and at least one electrical contact associated with each pin for connection to an electrical circuit, the said contacts and/or the pins of each row being supported side-by-side by a strip-like moulding extending along the row, the several mouldings being assembled in face-to-face relation to form a stack and being located by end locating means comprising, for each end of the mouldings, a grid having bars and slots extending widthwise of the mouldings, the ends of the mouldings being received within the slots and each slot being open at at least one end to permit insertion or removal of the mouldings in the lengthwise direction of the slots.

Preferably each grid comprises a length of strip material with transverse bars interconnected at their ends and with slots between the bars, the bars being bent out of the plane of the strip material to produce the open ends of the slots.

It is also preferred that the slots of each grid are formed by etching.

By way of example a specific embodiment in accordance with the invention will now be described with reference to the accompanying drawings in which:

FIGURE 2 is a plan view of the locating means for locating one end of the mouldings of the card sensing device shown in FIGURE 1;

FIGURE 3 is an end view of the locating means shown in FIGURE 2; and

Figure 1:
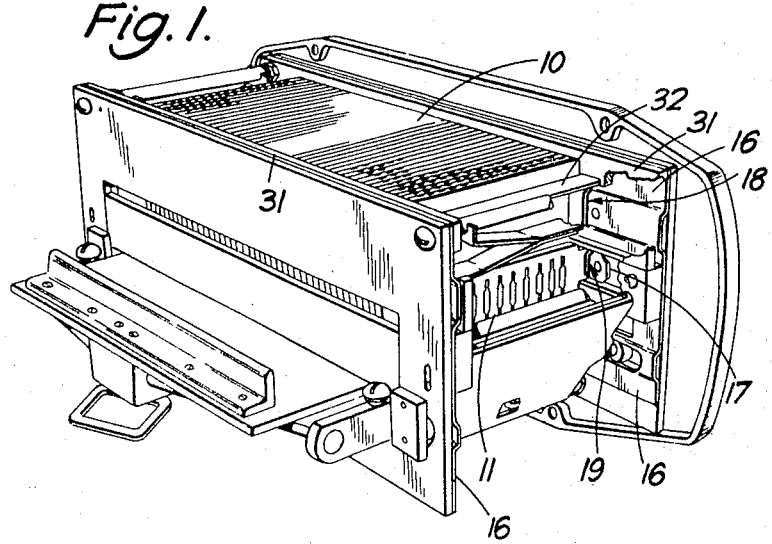
FIGURE 1 is a perspective view of the back and one end of a card sensing device.
Figure 4:
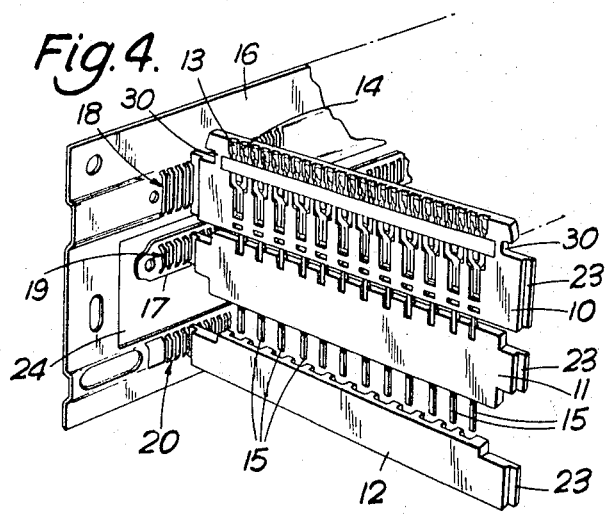
FIGURE 4 is a perspective view of the locating means shown in FIGURE 2 with one moulding of each stack of mouldings located in position.

The subject-matter of this embodiment comprises a card sensing device of which a general view is shown in FIGURE 1. The device is also fully described in copending application No. 639,561 filed May 18,1967 and therefore will not be described in detail in this specification, but rather only those parts of the sensing device which are relevant to this invention.

With reference to the drawings, the sensing device includes three stacks of strip-like mouldings 10, 11, 12, the stacks being arranged one above the other. The mouldings 10 of the top stack support pairs of contact blades 13, 14, each pair being associated with one of the sensing pins 15. These sensing pins 15 are mounted side-by-side in the mouldings 11 of the second stack, which stack is movable up and down relative to the top stack. The bottom stack of mouldings 12 comprise a support for a card being sensed.

Each moulding 10 of the top stack is located directly above the associated moulding 11 in the middle stack which moulding 11 is located directly above the associated moulding 12 in the bottom stack. Each stack is also formed by the mouldings being assembled in face-to-face relation.

The location of the mouldings of each stack is determined by end locating means. These means comprise, at each end of each stack of mouldings, lengths 16, 17 of strip material comprising three grids 18, 19, 20 having vertical bars 21 interconnected at their ends and with slots 22 between the bars. The slots 22 extend widthwise of the respective mouldings and the ends of the mouldings are provided with tags 23 of reduced thickness for insertion into the slots. The bars 21 of each grid are bent outwardly of the plane of the strip whereby the slots are open at both ends. These open ends of the slots permit insertion or removal of the mouldings in the lengthwise direction of the slots. It is thus possible to first fix the end locating strips in position and then to insert the mouldings therebetween. It is also possible to remove any one of the mouldings of each stack without necessarily removing the other mouldings of that stack. This feature is especially beneficial in respect of the mouldings of the top stack, which mouldings support the contacts 13, 14.

As shown by the drawings, each of the grids 18, 20 are formed integral with each other from the same length of strip material 16 and also the associated grid 19 is formed from a separate length of strip material 17 located within an aperture 24 in the strip 16. The strips 16, 17 are thus located in the same vertical plane. The aperture 24 is also of sufficient width to permit the necessary up and down movement of the strip 17 and the associated stack of mouldings 11.

In this example, the slots 22 of the grids 18, 19, 20 are formed by etching. Use of an etching process for this purpose has the advantage of avoiding any burrs that would be caused, e.g. by stamping out the slots.

Also an etching process has the added advantage of being flexible in that it is easier to ensure the alignment of the slots 22 of the two grids 18 and 20 and yet the positions or sizes of the slots may be easily changed.

As stated above, the mouldings of each stack may be inserted or removed from their end locating grids in the lengthwise direction of the slots of the grids. In order to assist the removal of the mouldings 10 of the top stack, each moulding is provided with a pair of end notches 30 and a C-shaped tool 32 (see FIGURE 1) is provided for reception in these notches. Thus any one of the moudings 10 may be individually removed by releasing retaining bars 31 (see FIGURE 1) for the mouldings 10, turning the tool 32 upwardly through 90°, sliding the tool along the row of mouldings to the one which it is required to remove and then raising the tool upwardly together with the moulding.

It has been described above that the grids 18, 19, 20 are formed from the two lengths of strip material 16, 17. However, during manufacture of the grids, the strip 17 is preferably integral with the strip 16 thereby facilitating the alignment of the slots 22 of each of the grids 18, 19, 20.

I claim:

1. A device for sensing holes in a punched card which device has a plurality of rows of sensing pins and at least one electrical contact associated with each pin for connection to an electrical circuit, at least the said contacts of each row being supported side-by-side by a strip-like moulding extending along the row, the several mouldings being assembled in face-to-face relation to form a stack and being located by end locating means comprising, for each end of the mouldings, a grid having bars and slots extending widthwise of the moudings, the ends of the mouldings being received within the slots and each slot being open at at least one end to permit insertion or removal of the mouldings in the lengthwise direction of the slots.

2. A device as claimed in claim 1 in which each grid comprises a length of strip material with transverse bars interconnected at their ends and with slots between the bars, the bars being bent out of the plane of the strip material to produce the open ends of the slots.

3. A device as claimed in claim 1 in which the slots of each grid are formed by etching.

4. A device as claimed in claim 1 including two stacks of mouldings, each stack having end locating means comprising grids as aforesaid, the grids at adjacent ends of the two stacks being integral and, for each member, the slots of the grid provided for reception of the ends of the mouldings of one stack being aligned with the slots of the grid provided for reception of the ends of the mouldings of the other stack whereby each moulding of the said one stack is aligned with a corresponding moulding of the other stack.

5. A device as claimed in claim 1 in which each end of at least some of the mouldings is provided with a notch or recess and in which a C-shaped tool is provided for engagement with the said recesses of any one of the mouldings in order to remove the moulding from the stack.

References Cited

UNITED STATES PATENTS 3,300,596   1/1967   Johnsen _____ 200—46

ROBERT K. SCHAEFER, *Primary Examiner.*

D. SMITH, JR., *Assistant Examiner.*

U.S. Cl. X.R.

235—61.11